United States Patent [19]

Fallon et al.

[11] 4,210,172
[45] Jul. 1, 1980

[54] APPARATUS FOR DISPENSING FLUID UNDER PRESSURE

[75] Inventors: Merton R. Fallon, Thousand Oaks, Calif.; Thomas W. Clements, Ambler, Pa.

[73] Assignee: Draft Systems, Inc., Northridge, Calif.

[21] Appl. No.: 944,963

[22] Filed: Sep. 22, 1978

Related U.S. Application Data

[62] Division of Ser. No. 668,648, Mar. 19, 1976, Pat. No. 4,135,641.

[51] Int. Cl.² .............................................. G05D 7/01
[52] U.S. Cl. .................................................... 137/504
[58] Field of Search ................................. 137/501, 504

[56] References Cited

U.S. PATENT DOCUMENTS

| 2,149,673 | 3/1939 | Godfrey | 137/504 X |
| 2,950,733 | 8/1960 | Perkins | 137/504 |
| 2,984,261 | 5/1961 | Kates | 137/504 X |
| 3,023,591 | 3/1962 | Tilney | 137/504 X |
| 3,122,162 | 2/1964 | Sands | 137/504 X |
| 3,886,968 | 6/1975 | Murrell | 137/501 |

Primary Examiner—Robert G. Nilson
Attorney, Agent, or Firm—Le Blanc, Nolan, Shur & Nies

[57] ABSTRACT

Disclosed is a fluid dispensing system for dispensing fluid from a container under pressure. An automatically variable restrictor is disposed in the fluid line between the container and the faucet whereby a constant predetermined flow rate is provided at the faucet. In one form hereof, the containers are serially connected one to the other with the restrictor placed between the last container and the faucet. In another form hereof, series/-parallel arrangements are provided wherein sets of serially connected containers are coupled in parallel one to the other with the last container of each set being fluid connected to the common faucet. A restrictor is placed in each set of serially connected containers between the last container and the parallel connection with the faucet whereby a constant flow rate through each parallel connected set of containers is obtained and equal to the number of sets of parallel connected containers divided by the desired flow rate through the common faucet.

3 Claims, 5 Drawing Figures

APPARATUS FOR DISPENSING FLUID UNDER PRESSURE

This is a division of application Ser. No. 668,648, filed Mar. 19, 1976, now U.S. Pat. No. 4,135,641.

The present invention relates to apparatus and methods for dispensing fluid under pressure and particularly relates to apparatus and methods for dispensing beer from pressurized kegs.

Prior to describing the structure, operation and various advantages and results of the present invention, a brief review of the nature of the beer product to be dispensed, the systems by which such beer product is dispensed, and certain basic considerations in providing a beer tapping system which ensures quality beer at the proper flow rate at the faucet is believed necessary for a proper understanding of the present invention. Considering first the nature of the beer product, it will be appreciated that beer is stored under pressure in a keg preferably at a specified temperature, i.e. about 38° F. During the brewing process, $CO_2$ gas is absorbed in the beer and remains in the beer while the beer is in the keg. It is necessary to maintain the keg under pressure to maintain the beer in a chemically stable condition with the proper carbonation level, i.e., proper level of gas absorbed in the beer. Accordingly, a certain pressure exists in the keg at its preferred storage temperature of about 38° F. and usually this pressure approximates 15.6 pounds. It will, however, be appreciated that the temperature and pressure of the beer in the keg are interdependent and that the preferred temperature and pressure conditions are not always obtained. The temperature and pressure conditions specifically referenced herein, while therefore only exemplary, do, however, illustrate the changing conditions of the beer from the time it is brewed to the time it is tapped.

In order to tap a single keg, for example at a beer dispensing establishment or tavern, a hose line is normally attached at one end to a keg tapping device, for example to the coupler of the tapping device described and illustrated in U.S. Pat. No. Re. 27,627 issued Apr. 17, 1973 (the disclosure of which is incorporated herein in its entirety by reference thereto as though fully set forth herein) and, at its other end to a beer dispensing faucet. Also, a second hose line connects between a gas pressure source and the coupler of the tapping device. It is conventionally desirable to flow beer from the dispensing faucet at the rate of 1 gallon per minute and, in fact most, if not all, commercially utilized bar dispensing faucets and pumping fixtures throughout the world are sized to provide a precise flow rate of one gallon per minute. However, beer in the keg at for example 15.6 lbs. over atmospheric pressure, cannot be exposed to atmospheric pressure since such lower pressure would not hold the gas in the beer and unpalatable and unsaleable foam would result. Accordingly, in commercial beer dispensing systems, it is necessary that the pressure of the beer in the keg be reduced to a controlled pressure at the faucet slightly above atmospheric pressure, i.e., approximately 1 pound above atmospheric pressure. In short, beer dispensing systems require a specific pressure restriction or drop between the keg and the faucet. In commercial establishments, this pressure drop is pre-calculated for existing tapping conditions whereby, ideally, the resistance through the keg and hose is substantially equal to the applied pressure. The fixed pressure restriction imposed on the system is a function of the length and diameter of the hose coupled between the keg and the faucet and also the lift loss or resistance in delivering the beer from the keg to the faucet. The pressure loss due to lift or elevation of the faucet above the keg is a fixed ratio of approximately 0.5 pounds per foot irrespective of hose line diameter. Thus, given the height, the lift loss can be calculated. To simplify the following illustration, the lift loss will be ignored and it will be assumed that the keg and faucet lie at approximately a like elevation. Accordingly, for a single keg containing beer at 15.6 pounds pressure, a three pound pressure drop across the keg, and a desired flow rate of 1 gallon per minute at a pressure slightly above atmospheric pressure at the faucet, for example 0.6 pounds, it will be seen that the fixed restriction must total 12 pounds. This can be obtained by utilizing four feet of 3/16 I/D polyvinyl hose which has a three pound resistance per foot at a flow rate of one gallon per minute. Thus, by using a 15.6 pound gas pressure source, and four feet of 3/16 I/D polyvinyl hose, the system is balanced, and beer can be dispensed at a rate of one gallon per minute at the faucet. If the faucet is elevated, the loss due to such elevation must be calculated. In that situation, usually a larger diameter hose would be utilized since the lift loss would normally constitute a large percentage of the majority of the fixed pressure restriction and the loss per foot of hose line must be reduced in order to provide beer at the faucet at 1 gallon per minute at about 0.6 pounds over atmosphere. There will be a slight variation in the flow rate through the faucet due to lift loss as the keg empties. Normally, however, this variation would not be sufficient to affect the quality of the beer dispensed.

Parenthetically, the rate of flow at one gallon per minute through a fixed orifice at the faucet also dictates the velocity of the beer dispensed from the faucet. An increase in velocity increases the foam rate while conversely a decrease in velocity decreases the form rate. Variable flow velocity at the faucet is a common occurrence and a trained bartender will vary the angle of the glass and its distance from the faucet to control the foam. In a properly controlled system having a constant flow rate of one gallon per minute, the foam rate is stabilized and the bartender need not angle the glass or raise or lower it relative to the faucet when drawing to control the foam rate. Consequently, it is highly desirable to automatically provide a constant flow rate of one gallon per minute through the faucet throughout the entirety of the dispensing operation and this, heretofore, has not been achieved.

In large beer dispensing establishments, it is very often desirable to provide two or more kegs of beer in series behind each faucet with the first keg coupled to the gas pressure source and the last keg coupled to the faucet. With this arrangement, the beer from the first keg flows into the second keg, the beer from the second keg flows into the third keg, and so on, to the faucet with the kegs emptying in sequence starting with the first keg, i.e., the keg nearest the gas source. As noted above, it is desirable that this system also provide a constant flow rate of one gallon per minute at the faucet at a pressure slightly greater than atmospheric pressure. That is, the pounds of resistance through the system should be equal to the pounds of applied pressure. To accomplish this, the fixed restriction between the last keg and the faucet is calculated considering also the pressure drop caused by flow through each keg. For example, to deliver one gallon per minute to a faucet at 0.6 pounds pressure above atmospheric pressure using three serially connected kegs each having a fixed pressure drop of 3 pounds per keg, a fixed restriction of approximately 7.5 pounds must be provided (the first keg has a 1.5 pound pressure drop since beer is flowing out from the keg and not into the keg as in the subsequent serially connected kegs). Assuming no lift losses, an initially balanced system can be provided using 2½ feet of 3/16 inch I/D polyvinyl hose. However, after the first keg is empty, the pressure loss in the system due to the pressure drop across the kegs and the fixed restriction total 12 lbs. or 3 pounds less than calculated for the system prior to tapping. Under these conditions and with a constant applied gas pressure, the beer is delivered to the faucet at a higher than desirable flow rate and in an overpressurized or oversaturated state resulting in flow of beer from the faucet which is substantially foam. A generally recognized upper limit for flow rate utilizing standard commercially available equipment is about 1.3 or 1.4 gallons per minute and a flow rate above this results in drawing foam rather than saleable palatable beer. It will be appreciated that the volumetric ratio of gas to beer is a critical factor in the taste of the beer. If greater than normal gas pressures are applied to the beer, the beer will absorb additional gas and become oversaturated and hence its taste will be affected. Thus, to effectively series tap a plurality of kegs, the bartender must constantly be aware of the gas pressure applied to the kegs and periodically reduce the same if beer is to be delivered at the desired pressure and flow rate. If initially the bartender sets the gas pressure at a lower level in the foregoing described series connections, in order to avoid such high pressures when the majority of the kegs are empty, the initial flow rate at the faucet is decreased to less than 1 gallon a minute. When the pressure of beer is reduced below its ideal pressure, the gas is let out of the beer and a chemical change occurs altering its taste. Also, the beer will draw flat.

In certain beer dispensing establishments, the fixed restriction between the last keg and the faucet is maintained constant while the number of kegs behind the faucet is varied. For example, if a fixed restriction of 7.5 pounds is maintained in the previously described system and six kegs are serially coupled behind the faucet, the applied pressure would be substantially less than the combined keg and hose line resistance whereby the flow rate would be reduced at the faucet to well below one gallon per minute. The balance between applied pressure and resistance of the kegs and lines would thus be upset. Under these circumstances, the bartender would most likely increase the applied gas pressure to increase the flow rate. However, after a number of kegs are emptied, the applied pressure would then greatly exceed the combined resistance of the kegs and lines with the result that oversaturated beer would flow at a high rate producing mostly foam at the faucet.

It will be appreciated that, in systems having kegs tapped in series, the capacity of the system in terms of number of kegs is limited dependent upon the particular pressure loss per keg. To increase the number of kegs behind a single faucet, series-parallel arrangements have been proposed. In such arrangements, two or more sets of serially connected kegs are connected in parallel between the gas pressure source and the faucet. The flow rate through each set of serially connected kegs is desirably equal to the desired one gallon per minute flow rate at the faucet divided by the number of sets of such serially connected kegs. The pressure loss per keg decreases proportionally to the decrease in flow rate and consequently it is possible to obtain the desired flow rate, foam condition and beer taste consistent with the above limitations on the single and series keg tapping systems. However, the pressure drop during tapping operations is a variable and again the bartender would normally adjust the applied pressure at periodic intervals in order to flow beer at the desired rate and quality.

In summary, the proper balance in a beer keg dispensing system, i.e., the balance between resistance of the keg(s), lines and lift losses on the one hand and the applied pressure on the other hand, has always been an initial problem to provide and an even greater problem to maintain during tapping even when the system calculations as above outlined are made. Because of the tendency of bartenders to alter the applied pressure depending upon the flow rate and beer conditions at any given time in efforts to improve the same and because the total pressure drop in every tapping system is always inherently a variable, it has been to a certain extent an art rather than a science to produce saleable palatable beer at the faucet. Consequently, there has arisen the need to provide a beer dispensing system wherein the flow rate and foam condition at the faucet is automatically maintained at a constant throughout the tapping operation irrespective of (a) the number of kegs in the tapping system, for example in multiples ranging from one keg to twenty-one, (b) the level of beer in any one or more of such kegs or (c) the applied pressure.

Accordingly, the present invention provides a keg tapping system which eliminates or minimizes the foregoing and other problems associated with prior keg tapping systems and provides a novel and improved keg tapping system having various advantages in construction, mode of operation and results in comparison with such prior systems. More particularly, the present invention provides a novel automatic variable restrictor usable in a pressurized fluid, i.e., beer, dispensing system to provide a desired fluid flow rate at the faucet at a desired pressure with unchanging quality and beer taste throughout the entire dispensing operation. This is accomplished irrespective of the applied gas pressure and also without requiring a change in beer hose length or diameter. Particularly, the present invention provides an automatic variable restrictor which adjusts the beer line flow rate to the desired level regardless of the applied gas pressure thereby achieving a constant flow rate and foam contition at the faucet. With the automatic varible restrictor hereof, it is virtually impossible in a tapping system properly set up in accordance with the invention hereof to intentionally or unintentionally alter the rate of flow and foam condition of the beer notwithstanding changes in the applied gas pressure or changes in the system, i.e., different temperatures and beer level(s), which would normally alter the flow rate and foam condition at the faucet. When the beer flow reaches the desired preset rate, the automatic variable restrictor throttles the flow down to exactly the desired flow rate by automatically balancing the restriction or pressure drop in the beer line with the changing requirements of the system.

More particularly, the automatic variable restrictor includes a housing having a beer inlet and an outlet on opposite sides of a diaphragm having a plurality of openings for permitting beer to flow from one side of the diaphragm to the other side. The restrictor also includes a valve comprised of an annular valve seat on the inside end of a nipple forming part of the outlet and which seat lies in spaced opposition to a sealing member carried by the diaphragm. The diaphragm is spring biased such that the member is biased away from the seat. The openings through the diaphragm permit a predetermined rate of flow across the diaphragm before significant movement of the diaphragm obtains. When the desired rate of flow is obtained, an incremental increase in flow causes the diaphragm to move forward the valve seat against the bias of the spring thus increasing the pressure drop across the valve. The pressure drop across the valve is a function of the distance between the diaphragm and the valve seat. Thus, the pressure drop across the valve is automatically adjusted in accordance with the rate of flow through the restrictor to provide a predetermined quantity flow rate at the faucet.

Accordingly, it is a primary object of the present invention to provide a novel and improved fluid dispensing system, particularly a beer dispensing system, and a novel and improved method of dispensing fluid, i.e. beer, from a pressurized fluid system.

It is another object of the present invention to provide a novel and improved system for dispensing fluid, i.e. beer, under pressure at a constant predetermined flow rate at a faucet.

It is a related object of the present invention to provide a novel and improved system for dispensing beer from a faucet at a constant flow rate and foam condition over a relatively wide range of applied pressure.

It is a further related object of the present invention to provide a novel and improved beer dispensing system wherein the pressure applied and resistance in the system are automatically balanced.

It is still another object of the present invention to provide a novel system for dispensing beer from multiple kegs connected to a single faucet while maintaining perfectly stable and constant flow rates at the faucet and enabling the beer to be dispensed in its optimum condition.

It is a further object of the present invention to provide a novel beer dispensing system wherein such constant flow rate and foam condition are maintained without requiring change in either beer hose lengths or diameter or a change when increasing or decreasing the number of bags behind a single faucet.

It is a still further object of the present invention to provide a novel and improved beer dispensing system wherein a constant flow rate and foam condition are obtained at the faucet notwithstanding miscalculation of pressures or system imbalance that normally would cause the beer to be chemically altered or improperly served by pressure maladjustment, variation or imbalance.

It is still a further object of the present invention to provide a novel and improved beer dispensing system wherein a constant flow rate and foam condition are obtained at the faucet at fixed restriction levels well below the levels currently useable. This feature permits a multiple connection of a larger number of kegs at given input pressures.

It is a further object of this invention to provide regulated flow between kegs in multiple and parallel connection such that the aggregate flow is maintained at 1 gallon per minute. This is accomplished by maintaining each parallel leg at its pro-rated rate of flow, i.e. $\frac{1}{2}$ gallon per minute for two parallel kegs or two parallel series of kegs; at $\frac{1}{3}$ gallon per minute for each parallel keg or parallel series of kegs in a triplex connection, etc.

This technique allows the regulated flow of beer at idealized beer pressure in every conceivable installation possible.

These and further objects and advantages of the present invention will become more apparent upon reference to the following specification, appended claims and drawings wherein:

Figure 1:
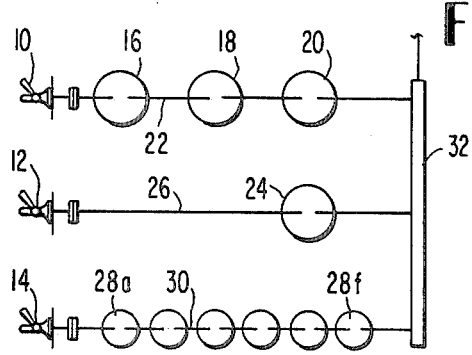
FIG. 1 is a schematic illustration of single and serially connected kegs coupled to a common gas manifold with each keg or serially connected sets of kegs being disposed behind a respective faucet.

Referring now to FIG. 1, there is illustrated a plurality of fluid dispensing systems by which is meant systems for dispensing fluid under pressure from one or more containers through a faucet, the fluid per se constituting any fluid capable of being held under pressure and dispensed through a faucet. For convenience, however, the following description is written with reference to a system for dispensing beer under pressure from one or more kegs through a faucet, it being appreciated that the following described beer dispensing system has application for dispensing other fluids, i.e. carbonated beverages such as soft drinks, dairy products, etc., under pressure from similar or other types of containers. Each illustrated beer dispensing system is comprised of a faucet 10, 12 or 14 with each system having one or more kegs disposed behind the corresponding faucet for delivery of beer from the container(s) to the corresponding faucet. For example, faucet 10 has three kegs 16, 18 and 20 serially connected to the other and to faucet 10 by hose lines indicated 22. Faucet 12 has a single keg connected thereto by a hose line 26. Faucet 14 has six kegs 28a–28f serially connected one to the other and to faucet 14 by hose lines 30. As illustrated in FIG. 1, the first keg in each set of kegs, i.e., kegs 20, 24, and 28f for delivery of beer to the respective faucets 10, 12 and 14, is coupled to a gas manifold 32 supplied by a source of gas under pressure, not shown and which manifold is common to each system. The source of gas may comprise a $CO_2$ cylinder or an air compressor or any other source of gas as desirable. Of course, the systems illustrated in FIG. 1 may each have their own separate source of gas under pressure. For example, each of the first kegs 20, 24 and 28f may be coupled to a $CO_2$ bottle, not shown, whereby each system is operable independently one from the other and does not draw gas from a common gas source. It will be appreciated that the foregoing is merely illustrative of the various numbers of kegs which may be disposed and serially connected behind each faucet.

Conventional keg tapping devices are disposed in each of the kegs whereby gas is permitted to flow into the keg and beer to flow out of the keg for delivery to the faucet. The keg tapping devices may comprise the type described and illustrated in the above noted U.S. Pat. No. Re. 27,627 of common assignee herewith. Other types of keg tapping devices may, of course, be utilized with the present invention such as for example the device disclosed in U.S. Pat. No. 3,228,413. Each such keg tapping device of these or similar types usually comprises a keg adapter and a coupler. The keg adapter is applied to the keg at the brewery and serves to seal the keg from the time the keg is filled with beer at the brewery to the time that the keg is tapped at the beer dispensing establishment. The keg adapter generally comprises discrete gas inlet and liquid outlet passages in communication with the keg with a normally closed valve in each such passage. The coupler is applied to the keg adapter at the beer dispensing establishment and also includes gas inlet and liquid outlet passages which are aligned and communicate with the corresponding gas inlet and liquid outlet passages through the keg adapter when attached thereto. The coupler usually includes at least one actuator for opening the normally closed valve in the liquid passage, preferably in response to securing the coupler to the adapter. The valves in the gas inlet passage may be opened by the incoming gas pressure or opened by an actuator carried by the coupler. When tapping a single keg, the gas inlet passage of the coupler is connected to a source of gas under pressure and the liquid outlet passage of the coupler is connected to a faucet. When multiple kegs are tapped, the gas inlet passage attached to the first keg is connected to the gas pressure source while the fluid outlet passage through the coupler and adapter is connected to the gas inlet passage of the tapping device disposed in the succeeding keg which is connected to the gas inlet passage of the tapping device in the next succeeding keg with the liquid outlet passage of the tapping device in the last keg being connected to the faucet.

It will be appreciated that in tapping a single keg, the gas from the gas pressure source enters the keg through the communicating gas inlet passages of the coupler and keg adapter to drive the beer from the keg through the communicating liquid outlet passages of the coupler and keg adapter and through a hose line for delivery of beer to the faucet. In tapping multiple serially connected kegs, the gas under pressure drives the beer from the first serially connected keg into the next or succeeding serially connected keg with the beer being displaced from keg to keg in succession for delivery to the faucet. That is, the beer from the first serially connected keg enters the next serially connected keg through the inlet passage of the tapping device in the next keg while the beer in such next keg flows through the aligned beer passages of the adapter and coupler thereof toward and for delivery to the succeeding serially connected keg or the faucet, as applicable. Thus, in series connections, the kegs empty in sequence starting with the first keg next to the gas source.

Figure 2:
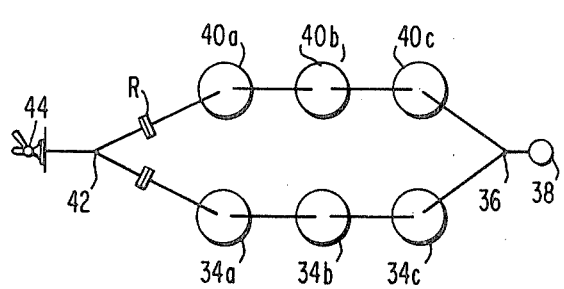
FIG. 2 is a schematic illustration of a series parallel hookup of beer kegs.

Referring now to FIG. 2, there is illustrated a parallel series keg connection comprising on one side a plurality of kegs 34a, 34b and 34c connected serially one to the other and through one leg of a Y-connection 36 to a gas pressure source 38. On the other side, there is provided a plurality of kegs 40a, 40b and 40c connected serially one to the other and through the other leg of the Y-connection 36 to gas pressure source 38. Each set of the serially connected kegs are coupled through the respective legs of a Y-connection 42 to a single faucet 44 whereby the kegs in both sets of serially connected kegs simultaneously supply beer to the faucet 44 as described in detail hereinafter. As in the previously described systems, the parallel/series connected kegs are provided with keg tapping devices, for example of the type disclosed in U.S. Pat. No. Re. 27,627. It will be appreciated that, in this parallel/series dispensing system, gas flows from gas pressure source 38 through the Y-connection 36 simultaneously into each of the serially connected sets of kegs to drive the beer therethrough from one keg to the next and simultaneously to the faucet 44 via the Y-connection 42.

In each of the above-described tapping systems, there is provided an automatic variable restrictor R between the faucet and the keg or kegs providing beer to the faucet. The automatic variable restrictor R enables flow of beer from the faucet at a predetermined rate regardless of the pressure applied to the keg or kegs or variations in pressure within the system due to operating conditions.

Figure 3:
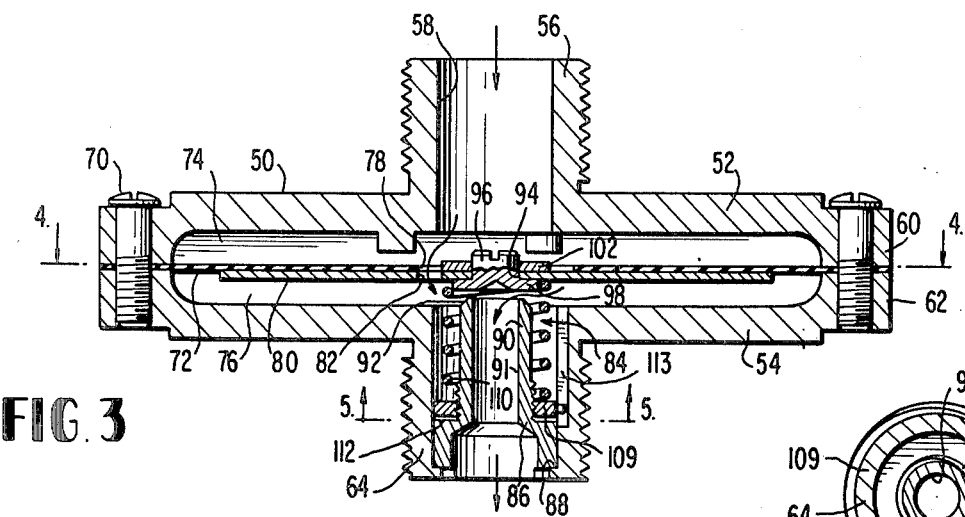
FIG. 3 is a vertical cross-sectional view illustrating an automatic variable restrictor constructed in accordance with the present invention and useful in the tapping systems illustrated in FIGS. 1 and 2.
Figure 5:
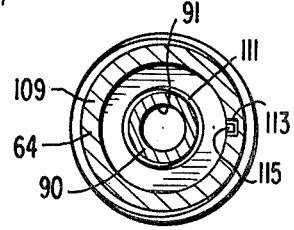
FIG. 5 is a cross-sectional view thereof taken generally about on line 5—5 in FIG. 3.
Figure 4:
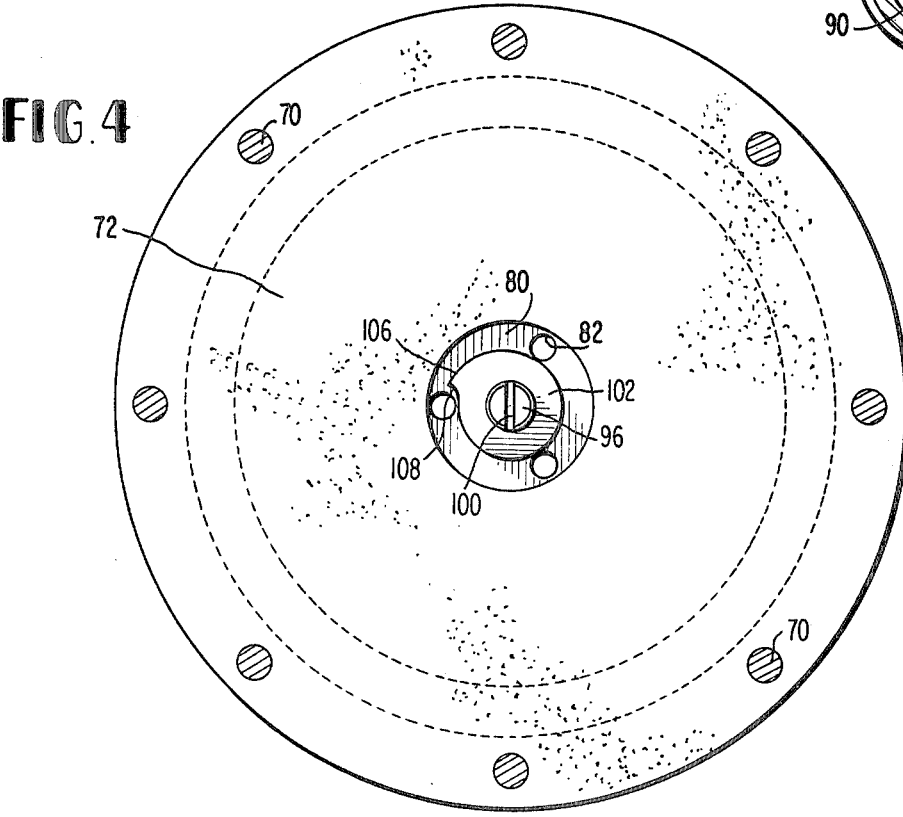
FIG. 4 is a cross-sectional view of the restrictor illustrated in FIG. 3 taken generally about on line 4—4 in FIG. 3.

Referring now to FIGS. 3 and 4, the automatic variable restrictor comprises a cylindrical housing 50 comprising a pair of generally shallow, cup-shaped, housing sections 52 and 54. Housing section 52 has a central, outwardly projecting externally threaded nipple 56 having a beer inlet passage 58 therethrough. Housing section 52 also has an axially extending flange 60 about its periphery and which flange lies in opposition to a like axially projecting flange 62 mounted about the periphery of housing section 54. Housing section 54 also includes a central, externally threaded, nipple 64.

Housing sections 52 and 54 are secured in opposition one to the other by the threaded bolts 70 which extend through flanges 60 and 62 at circumferentially spaced positions about housing 50. The margins of a diaphragm 72 are disposed between flanges 60 and 62 when the housing sections 52 and 54 are secured one to the other and diaphragm 72 defines with the housing sections 52 and 54 chambers 74 and 76 on opposite sides thereof. Diaphragm 72 is preferably formed of an elastomeric material of great long-term resiliency and loss rigidity which is compatible with the liquid being dispensed. Diaphragm 72 has a central aperture 78 and is secured on one side of a reduced diameter, preferably metal, disc 80 by a suitable epoxy or adhesive, or the diaphragm/disc combination may be integrally molded together. Disc 80 has a plurality of apertures 82 disposed centrally thereof and located to lie within the perimeter of aperture 78 in diaphragm 72. Preferably, three apertures 82 are provided and it will be appreciated, from a review of FIG. 3, that aperture 78 through diaphragm 72 and apertures 82 through metal disc 80 permit communication between chambers 74 and 76 on opposite sides of the diaphragm. Thus beer from the keg or kegs flows through passage 58 into chamber 74 and through the diaphragm aperture 78 and plate apertures 82 into chamber 76 for delivery through outlet passage 66.

A valve, generally indicated 84, is disposed in chamber 76 on the downstream side of diaphragm 72. Valve 84 includes a hollow stem or nozzle 86 which is diametrically enlarged at one end for engagement against an inwardly directed shoulder 88 formed on the outer end of outlet nipple 64. Stem 86 includes a central sleeve 90 defining a beer outlet passage 91. Sleeve 90 terminates at its inner end in a valve seat 92 which is comprised of a circular knife edge. Disc 80 has a central aperture 94 in which is received a pin 96. Pin 96 is diametrically enlarged on one side to form a flat, disc-like, valve member 98 in spaced opposition to valve seat 92. Pin 96 is slotted along its head at 100 and a generally annular washer 102 is received over the head of pin 96 on the side of disc 80 remote from valve member 98. Washer 102 is secured to pin 96 by a suitable epoxy. For reasons noted below, pin 96 is rotatable within aperture 94.

As illustrated in FIG. 4, the outer surface of washer 102 constitutes a cam surface 106 which spirals outwardly to provide a step 108 at circumferential position about washer 102. Washer 102 has a perimeter throughout a major portion of its circumference which lies radially within apertures 82 through disc 80. Cam surface 106, however, is spaced radially outwardly such that rotation of washer 102, for example by inserting a screwdriver blade into slot 100, enables cam surface 106 to cover a portion of one of the apertures 82.

A ring 109 is internally threaded for threaded engagement with an externally threaded base portion 111 on stem 86. The interior wall of nipple 64 is provided with an axially extending slot 113 in which is received a radially projecting pin 115 carried by ring 109 whereby ring 109 is splined to nipple 64 enabling axial movement of ring 109 upon rotation of stem 86 for reasons hereinafter discussed. A helical spring 110 seats at one end against ring 109. The opposite end of the spring seats against disc 80 about plate 98 and radially inwardly of apertures 82. Consequently, spring 110 biases the plate 80 and diaphragm 72 into the position illustrated in FIG. 3 with valve member 98 spaced a substantial distance from valve seat 92.

The apertures 82 through disc 80 are initially sized during manufacture and the tension on spring 110 is initially adjusted to spaced valve element 98 carried by diaphragm 72 from valve seat 92 a predetermined distance substantially as illustrated in FIG. 3 such that the desired flow rate, for example one gallon per minute, is obtained through variable restrictor 50. To adjust the spring tension, an expandable tool, not shown, is receivable within the bore of nipple 64 to rotate the latter. Rotation of nipple 64 causes ring 109 to move axially due to its threaded engagement with stem 86 and its splined connection to nipple 64. Thus, axial displacement of ring 109 adjusts the tension on spring 110 and adjustably spaces the valve element 98 relative to valve seat 92 whereby, in conjunction with the specifically sized apertures 82 through disc 80, a predetermined flow rate through restrictor 50 is obtained. After the tension on the spring is adjusted, the nipple 64 and outer end of stem 86 are fused one to the other to prevent inadvertent rotation of stem 86 relative to nipple 64 and hence prevent variations in adjustment during use. Upon an increase in the flow rate and pressure of the beer entering restrictor 50 through inlet passage 58, the pressure drop across diaphragm 72 increases and serves to displace diaphragm 72 and hence valve element 98 toward valve seat 92. The valve opening is thus constricted and a significant pressure drop across the diaphragm and across the valve opening reduces the pressure of the fluid flowing through the outlet passage 91 and the rate of flow through such passage. With the specifically sized apertures and spring force, such reduction in pressure and flow rate maintains the desired pressure (approximately atmospheric) and flow rate, preferably one gallon per minute at the faucet. That is to say, for flow rates through the restrictor up to one gallon per minute, the flow rate through the apertures in the disc and across the valve is substantially unaffected by the combined pressure drop across the apertures and across the valve opening. When the flow rate across the diaphragm increases beyond the specified flow rate of one gallon per minute, the movement of the valve element 98 toward valve seat 92 induces a significant pressure drop across the valve. That is, when the flow rate is greater than one gallon per minute the pressure drop across the valve increases significantly and as a function of the distance of the valve element carried by the diaphragm from the valve seat. The increased pressure drop reduces the flow rate such that the desired flow rate of one gallon per minute at the desired pressure is obtained at the outlet passage 91.

It will be appreciated that the above example with respect to the desired flow rate is exemplary only and other flow rates can be obtained with appropriately sized apertures through diaphragm 72. Particularly, to provide a one gallon per minute restrictor as above described, three apertures 82 through the disc 80 are provided with each aperture having 0.148–0.150 inch diameter. If a half-gallon flow rate is desired through the restrictor 50, the three apertures 82 would each have an orifice of 0.109–0.111 inch diameter.

In using the restrictor 50 illustrated in FIGS. 3 and 4 in keg tapping systems for example when tapping a single keg, the restrictor is placed in the hose line between the keg and faucet. In the previously disclosed illustrative example a single keg containing beer with 15.6 pounds of applied pressure, a 3 pound pressure drop across the keg, and a desired flow rate of one gallon per minute at a pressure slightly above atmospheric pressure at the faucet, for example 0.6 pounds, were assumed. Normally a fixed restriction of 12 pounds as set forth previously would be calculated and a hose line (ignoring lift losses) providing 12 pounds pressure drop or resistance would be provided. With the restrictor in the hose line, any increase in applied pressure which would normally increase the rate of flow through the faucet, oftentimes resulting in foaming beer, would be automatically balanced by the increased flow resistance or pressure drop across restrictor 50 such that one gallon per minute at the specified pressure 0.6 pounds over atmospheric would be obtained at all times at the faucet and throughout the entire tapping operation. In short, when the beer flow reaches the preset flow rate, the restrictor automatically throttles down to maintain that flow rate by automatically balancing the restriction or pressure drop in the beer line with the applied pressure.

Preferably, and particularly to eliminate errors in calculation the restriction to be placed into the beer line, i.e., errors made in measuring or sizing the beer hose, the restriction in the beer line per se is reduced by several pounds for example by shortening the existing hose or by using a larger diameter hose or both when the tapping system is initially set up. Thus, the fixed restriction imposed on the system by the hose line is less than would normally be required to balance the applied pressure with hose line resistance. However, with the restrictor 50 disposed in the hose line, the previously unbalanced system automatically becomes balanced with the restrictor 50 automatically providing the additional and necessary pressure drop or restriction ahead of the faucet. Thus, when the restrictor hereof is utilized, shorter hose lengths and/or larger diameter hoses are preferably utilized since the restrictor automatically adjusts for the imbalance of the system caused by providing less resistance or pressure drop in the hose line than actually necessary to balance the system.

The restrictor 50 hereof is especially useful for series tapping operations where the applied pressure varies significantly from the start through to the end of the tapping operation. It will be recalled that, as each serially connected keg empties, the system becomes unbalanced due to the loss of pressure drop or restriction afforded the initial system by such keg when full. For example and using the illustrative example previously set forth regarding a series hook-up with three kegs in series each having a fixed pressure drop of 3 pounds per keg, and with a fixed restriction of approximately 7.5 pounds, it will be seen that upon emptying the first keg, the applied pressure will be 3 pounds greater than the combined hose line and keg restriction. When the restrictor 50 hereof, however, is introduced between the last keg and the faucet, the restrictor automatically imposes an additional pressure drop or restriction in the hose line equal in magnitude to the pressure drop lost to the system when the first keg empties whereby the system remains in a balanced condition, that is, applied pressure being equal to pounds of resistance or pressure drop in the system. As in the case of a single keg, the restrictor is inserted in the series connection in the hose line between the last keg and faucet and wherein such hose line, preferably, has been precalculated to provide a restriction several pounds less than would normally be necessary to provide an initially balanced keg tapping system. The restrictor 50 automatically imposes on the system the necessary additional restriction, in this case 3 pounds, and any additional restriction necessary as the kegs are sequentially emptied to at all times provide a desired constant flow rate at the faucet, for example and preferably, one gallon per minute.

In the example of the parallel/series hook-up illustrated in FIG. 2, a restrictor is located in each of the serially connected sets of kegs between the last serially connected keg and the Y-connection 42 preceding the faucet. Assuming that a flow rate of one gallon per minute is desired at the faucet, the restrictors 50 in this case are each designed to flow fluid at a rate of one-half gallon per minute whereby the combined flow rate at the faucet remains one gallon per minute. Thus, as each set of serially connected kegs empties sequentially, each restrictor imposes an additional pressure drop or restriction on the particular set of serially connected kegs to achieve the desired flow rate of one-half gallon per minute to the Y-connection 42. In the series/parallel hook-up it is important to provide a check valve in the coupler of the last serially connected keg to preclude backflow of beer from one set of serially connected kegs to the other set.

Presently, many long-draw installations cannot connect in multiple connection because of the excessive pressure input required and cannot draw in parallel connection because the parallel kegs deplete unequally. If, for example, one of paralleled kegs is 2° higher in temperature than the other, the high temperature (high pressure) keg will deplete at almost twice the rate the lower temperature keg will. The variable restrictor hereof, however, maintains flow rate equally from all the parallel kegs or legs and takes advantage of this vastly lowered pressure drop. For example, 6 kegs in in straight series connection, each having a 3 pound pressure drop, would have a total pressure drop of 18 lbs. and could never be used without overpressurizing the beer. If, however, they were connected in two parallel legs of three kegs each, the total pressure drop would be 5 lbs. Additionally, if the same six kegs are connected in three parallel legs of two kegs each, the total pressure drop obtained would be 1.3 lbs. Stated differently, with the variable restrictor hereof, 6 kegs can be connected in three parallel legs of two kegs each with a total pressure loss of 4.5 lbs whereas two kegs alone in straight series at 1 gallon per minute would induce a pressure drop of 5 lbs. With these variables useable by regulating the flow action, any reasonable number of kegs can be connected to any system currently drawing beer and draw beer at the regulated 1 gallon per minute rate at idealized beer pressure/temperature relationship.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and equivalency of the claims are therefore intended to be embraced therein.

What is claimed and desired to be secured by United States Letters Patent is:

1. An automatic variable restrictor for delivering fluid under pressure through a faucet at a predetermined flow rate comprising:

a housing defining a chamber and having a fluid inlet and a fluid outlet in communication with said chamber;

a diaphragm carried by said housing segregating said chamber such that said fluid inlet and said fluid outlet lie on respective opposite sides of said diaphragm;

a valve carried by said housing including a valve seat defining a valve opening and a valve element spaced from said seat and carried by said diaphragm for movement toward and away from said seat, means carried by said housing for adjusting the spacing between said valve seat and said valve element, means engaging said diaphragm and biasing said valve element in a direction away from said valve seat said biasing means including a spring engaging said diaphragm at one end thereof, an annular element carried by said housing for axial movement toward and away from said diaphragm and providing a seat for the opposite end of said spring, and means carried by said housing for axially displacing said spring; said annular element being internally threaded, said outlet including an annular member having an externally threaded portion in threaded engagement with said annular element and carried by said housing for rotational movement, and means coupled between said housing and said annular element for preventing rotational movement thereof;

said diaphragm having at least one aperture therethrough for delivery of fluid flowing through said inlet under pressure into said housing on one side of said diaphragm to the opposite side of said diaphragm and responsive to a pressure in excess of a predetermined pressure acting on the one side of said diaphragm to move said valve element toward said valve seat against the bias of said biasing means to induce an increased pressure drop across the valve opening and thereby maintain a predetermined rate of flow through said outlet.

2. An automatic variable restrictor for delivering fluid under pressure through a faucet at a predetermined flow rate comprising:

a housing defining a chamber amd having a fluid inlet and a fluid outlet in communication with said chamber;

a diaphragm carried by said housing segregating said chamber such that said fluid inlet and said fluid outlet lie on respective opposite sides of said diaphragm;

a valve carried by said housing including a valve seat defining a valve opening and a valve element spaced from said seat and carried by said diaphragm for movement toward and away from said seat, means engaging said diaphragm and biasing said valve element in a direction away from said valve seat;

said diaphragm including a flexible member connected to said housing about its margins having at least one aperture therethrough for delivery of fluid flowing through said inlet under pressure into said housing on one side of said diaphragm to the opposite side of said diaphragm and responsive to a pressure in excess of a predetermined pressure acting on the one side of said diaphragm to move said valve element toward said valve seat against the bias of said biasing means to induce an increased pressure drop across the valve opening and thereby maintain a predetermined rate of flow through said outlet and means for adjusting the size of the aperture through said diaphragm including a disc carried thereby and rotatable relative to said diaphragm, said disc having a portion thereof for covering at least part of said aperture in response to rotation of said disc.

3. An automatic variable restrictor for delivering fluid under pressure through a faucet at a predetermined flow rate comprising:

a housing defining a chamber and having a fluid inlet and a fluid outlet in communication with said chamber;

a diaphragm carried by said housing segregating said chamber such that said fluid inlet and said fluid outlet lie on respective opposite sides of said diaphragm;

a valve carried by said housing including a valve seat defining a valve opening and a valve element spaced from said seat and carried by said diaphragm for movement toward and away from said seat, means engaging said diaphragm and biasing said valve element in a direction away from said valve seat;

said diaphragm having at least one aperture therethrough for delivery of fluid flowing through said inlet under pressure into said housing on one side of said diaphragm to the opposite side of said diaphragm and responsive to a pressure in excess of a predetermined pressure acting on the one side of said diaphragm to move said valve element toward said valve seat against the bias of said biasing means to induce an increased pressure drop across the valve opening and thereby maintain a predetermined rate of flow through said outlet;

said diaphragm including a flexible member connected to said housing about its margins, a disc coaxially carried by said diaphragm, said flexible member and said disc having registering openings constituting said one aperture, means for adjusting the size of the aperture through said diaphragm including a second disc carried thereby and rotatable relative to said diaphragm, said second disc being carried on the side of the diaphragm remote from the first mentioned disc, said valve element being carried by the first mentioned disc and having a pin engaging through the first mentioned disc, the diaphragm and the second disc, said second disc having a portion thereof for covering at least a part of said aperture in response to rotation of the second disc.

* * * * *